US009204216B2

(12) United States Patent
Chen et al.

(10) Patent No.: US 9,204,216 B2
(45) Date of Patent: Dec. 1, 2015

(54) AUDIO SYSTEM OF A VEHICLE

(71) Applicant: HON HAI PRECISION INDUSTRY CO., LTD., New Taipei (TW)

(72) Inventors: Chih-Ming Chen, New Taipei (TW); Tun-Hsiang Shih, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 153 days.

(21) Appl. No.: 14/137,321

(22) Filed: Dec. 20, 2013

(65) Prior Publication Data

US 2014/0376739 A1 Dec. 25, 2014

(30) Foreign Application Priority Data

Jun. 24, 2013 (TW) ............................. 102122441 A

(51) Int. Cl.
*H04B 1/00* (2006.01)
*H04R 5/02* (2006.01)
*H04R 1/02* (2006.01)
*B60Q 1/00* (2006.01)
*G08B 23/00* (2006.01)
*H04R 3/00* (2006.01)

(52) U.S. Cl.
CPC .............. *H04R 3/00* (2013.01); *H04R 2499/13* (2013.01)

(58) Field of Classification Search
CPC ......... H04R 3/00; H04R 2499/13; H04R 1/00
USPC ........... 381/86, 306, 302, 389, 395, 173, 174, 381/190, 191; 340/438, 988, 500
See application file for complete search history.

(56) References Cited

U.S. PATENT DOCUMENTS 7,672,756 B2 * 3/2010 Breed ............................... 701/1
8,879,771 B2 * 11/2014 Mellow et al. ................ 381/388

* cited by examiner

*Primary Examiner* — Thjuan K Addy
(74) *Attorney, Agent, or Firm* — Novak Druce Connolly Bove + Quigg LLP

(57) ABSTRACT

An audio system of a vehicle includes a mainframe, a panel computer, and a power converting circuit. The mainframe includes a power signal output terminal. The power converting circuit includes a charging unit, a switch unit, and a battery unit. When the power signal output terminal is electrically connected to the power converting circuit, the power signal output terminal outputs a first DC voltage to the power converting circuit, the power converting circuit converts the first DC voltage to a second DC voltage, which is provided to the panel computer, and the first DC voltage charges the battery unit via the charging unit and the switch unit. When the power signal output terminal and the power converting circuit are disconnected, the battery unit outputs the first DC voltage, and the power converting circuit converts the first DC voltage into the second DC voltage, which is provided to the panel computer.

18 Claims, 2 Drawing Sheets

AUDIO SYSTEM OF A VEHICLE

BACKGROUND

1. Technical Field

The present disclosure relates to an audio system of a vehicle.

2. Description of Related Art

Nowadays, many audio systems of vehicles are incorporated in display systems. However, the display systems may not be detached from the audio system. As such, it may be inconvenient to perform maintenance on the display systems and to update software of the display systems.

Therefore, there is a need for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
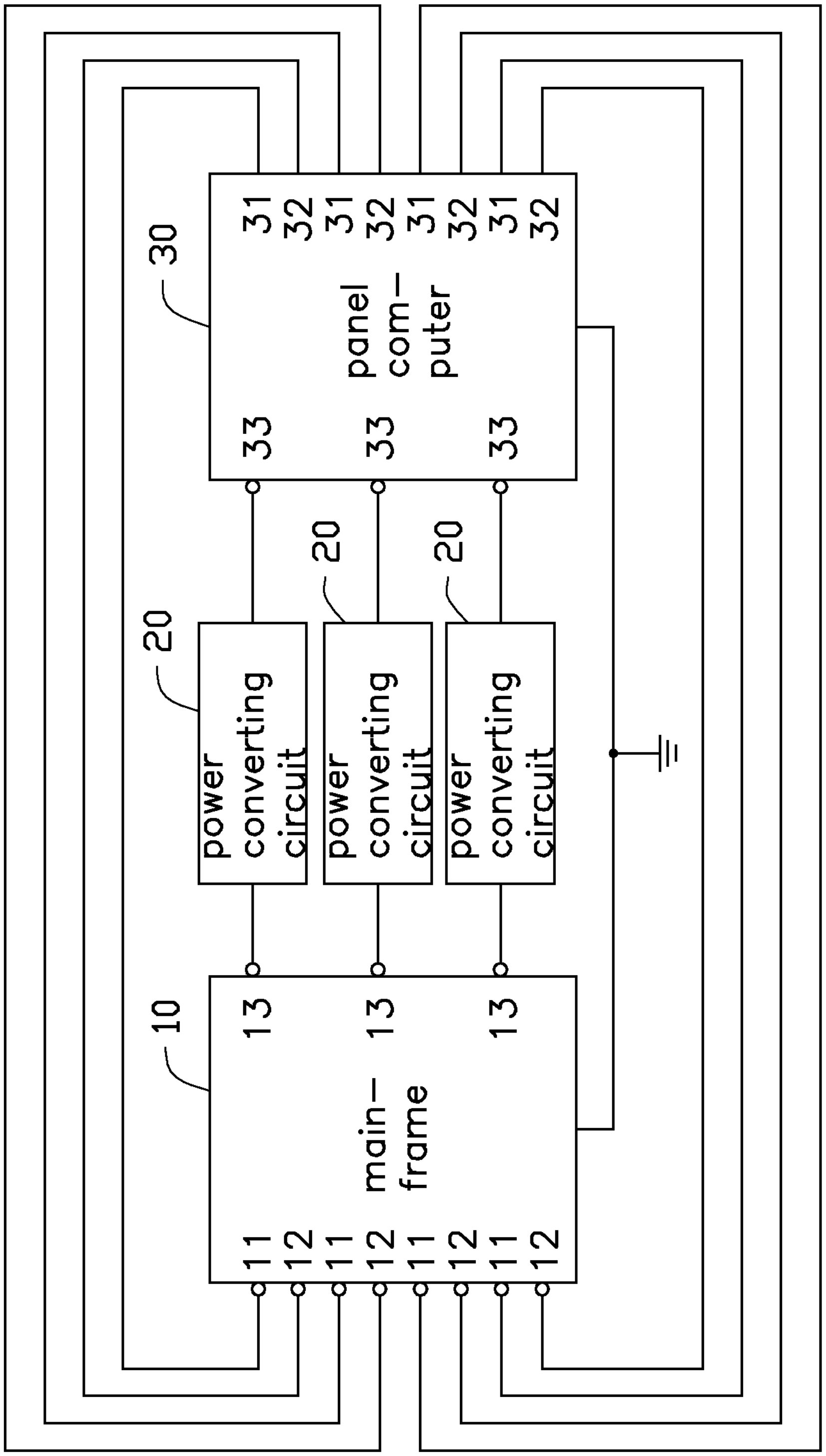
FIG. 1 is a block diagram of an embodiment of an audio system of a vehicle.
Figure 2:
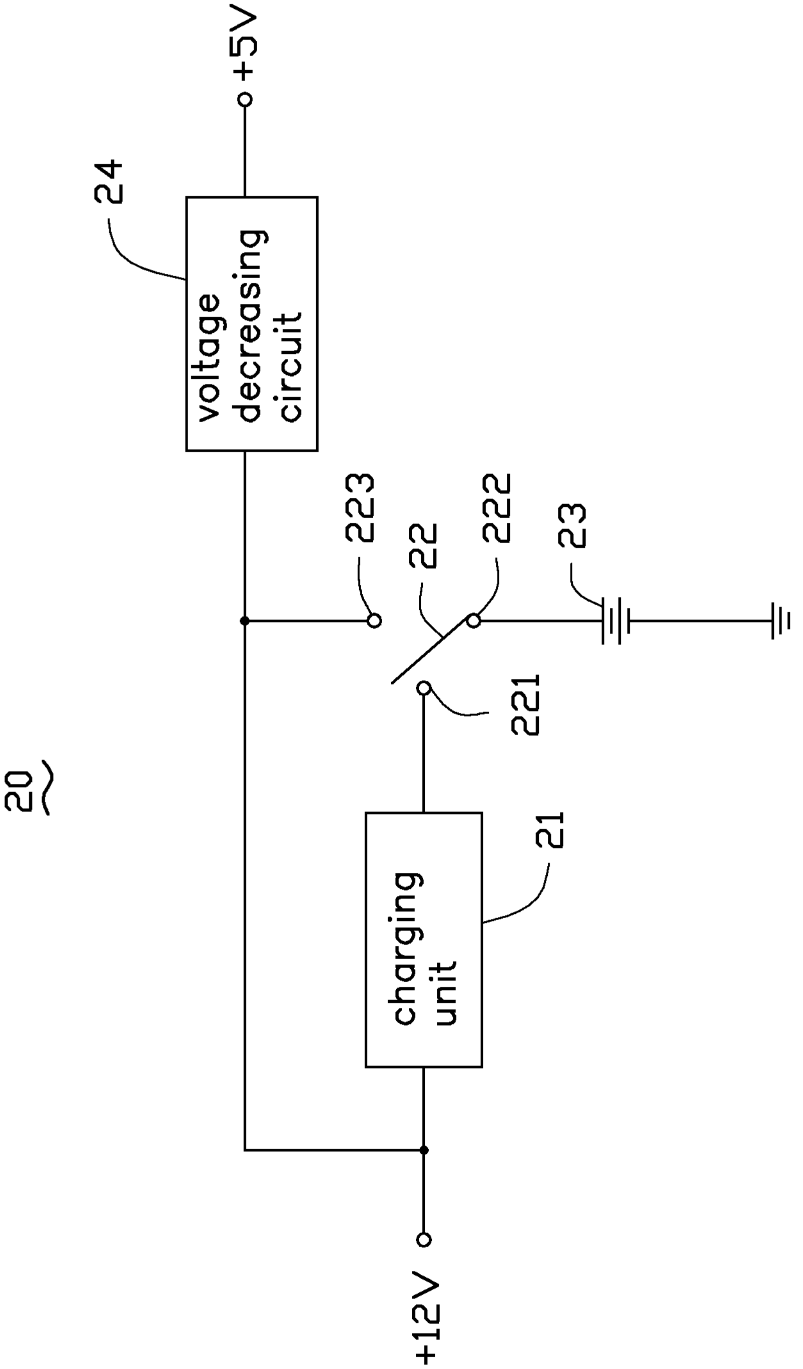
FIG. 2 is an embodiment of a circuit diagram of a power converting circuit of FIG. 1.

FIGS. 1 and 2 show one embodiment of an audio system of a vehicle. The system includes a mainframe 10, multiple power converting circuits 20, and a panel computer 30.

The mainframe 10 includes multiple audio signal positive output terminals 11, multiple audio signal negative output terminals 12, and multiple power signal output terminals 13. Each power signal output terminal 13 outputs a first Direct Current (DC) voltage to a corresponding power converting circuit 20. In one embodiment, the first DC voltage is +12 volts (V).

Each of the multiple power converting circuits 20 includes a charging unit 21, a switch unit 22, a battery unit 23, and a voltage decreasing circuit 24. The switch unit 22 includes a first terminal 221, a second terminal 222 and a third terminal 223. A first terminal of the charging unit 21 is electrically connected to the corresponding power signal output terminal 13 to receive the first DC voltage. A second terminal of the charging unit 21 is electrically connected to the first terminal 221 of the switch unit 22.

The second terminal 222 of the switch unit 22 is grounded via the battery unit 23. The third terminal 223 of the switch unit 22 is electrically connected to the first terminal of the charging unit 21 and a first terminal of the voltage decreasing circuit 24. A second terminal of the voltage decreasing circuit 24 is configured for outputting a second DC voltage, which is provided to the panel computer 30. In one embodiment, the second DC voltage is +5V. The switch unit 22 is a single-pole, double-throw switch.

The panel computer 30 includes multiple audio signal positive input terminals 31, multiple audio signal negative input terminals 32, and multiple power signal input terminals 33. Each audio signal positive input terminal 31 is electrically connected to a corresponding audio signal positive output terminal 11, each audio signal negative input terminal 32 is electrically connected to a corresponding audio signal negative output terminal 12, and each power signal input terminal 33 is electrically connected to the second terminal of a corresponding voltage decreasing circuit 24 to receive the second DC voltage. In one embodiment, the panel computer 30 is removable from the system. The panel computer 30 can be electrically connected to the mainframe 10 by connecting lines or by an inserting card and inserting slot.

In use, the mainframe 10 outputs audio signals through the multiple audio signal positive output terminals 11 and the multiple audio signal negative output terminals 12. The multiple audio signal positive input terminals 31 and the multiple audio signal negative input terminals 32 of the panel computer 30 receive the audio signals. The panel computer 30 converts the audio signals into sound and outputs the sound.

When the panel computer 30 is attached to the system, the first terminal 221 and the second terminal 222 of the switch unit 22 are electrically connected, and the second terminal 222 and the third terminal 223 of the switch unit 22 are disconnected, which causes the power signal output terminals 13 output the +12V first DC voltage to the power converting circuits 20. The voltage decreasing circuits 24 convert the +12V first DC voltage to the +5V second DC voltage, and the +5V second DC voltage is provided to the panel computer 30. The +12V first DC voltage charges the battery unit 23 via the charging unit 21.

When the panel computer 30 is detached from the system, the first terminal 221 and the second terminal 222 of the switch unit 22 are disconnected, and the second terminal 222 and the third terminal 223 of the switch unit 22 are electrically connected, which causes the power signal output terminals 13 to not output the +12V first DC voltage to the power converting circuit 20. The battery unit 23 outputs the +12V first DC voltage to the voltage decreasing circuit 24, and the voltage decreasing circuit 24 converts the +12V first DC voltage into the +5V second DC voltage. The +5V second DC voltage is provided to the panel computer 30. Thus, the panel computer 30 can be detached from the system and still function properly.

Even though numerous characteristics and advantages of the present disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. An audio system configured for a vehicle comprising:

a mainframe comprising an audio signal positive output terminal and a power signal output terminal, the audio signal positive output terminal being configured to output an audio signal;

a panel computer comprising an audio signal positive input terminal, the audio signal positive input terminal being configured to receive the audio signal, the panel computer being configured to convert the audio signal to an sound signal and to output the sound signal; and a power converting circuit comprising a charging unit, a switch unit and a battery unit; wherein when the power signal output terminal is electrically connected to the power converting circuit, the power signal output terminal outputs a first Direct Current (DC) voltage to the power converting circuit, the power converting circuit converts the first DC voltage to a second DC voltage which is provided to the panel computer, the first DC voltage charges the battery unit via the charging unit and the switch unit; and when the power signal output terminal and the power converting circuit are disconnected, the battery unit outputs the first DC voltage, the power converting circuit converts the first DC voltage to the second DC voltage which is provided to the panel computer.

2. The audio system of claim 1, wherein the power converting circuit further comprises a voltage decreasing circuit; a first terminal of the charging unit is electrically connected to the power signal output terminal to receive the first DC voltage; the first terminal of the charging unit is electrically connected to the panel computer via the voltage decreasing circuit; a second terminal of the charging unit is electrically connected to the switch unit; the switch unit is grounded via the battery unit; and the switch unit is electrically connected to the panel computer via the voltage decreasing circuit.

3. The audio system of claim 2, wherein the switch unit comprises a first terminal, a second terminal and a third terminal; the second terminal of the charging unit is electrically connected to the first terminal of the switch unit; the second terminal of the switch unit is grounded via the battery unit; the third terminal of the switch unit is electrically connected to the first terminal of the charging unit; the third terminal of the switch unit is electrically connected to a first terminal of the voltage decreasing circuit; and a second terminal of the voltage decreasing circuit is configured for output the second DC voltage.

4. The audio system of claim 3, wherein the mainframe further comprises an audio signal negative output terminal; the panel computer further comprises an audio signal negative input terminal; the audio signal positive output terminal is configured to output the audio signal; and the audio signal negative input terminal is electrically connected to the audio signal negative output terminal to receive the audio signal.

5. The audio system of claim 4, wherein the first DC voltage is +12V; and the second DC voltage is +5V.

6. The audio system of claim 4, wherein panel computer is electrically connected to the mainframe by connecting lines or by inserting card and inserting slot.

7. The audio system of claim 4, wherein when the panel computer is attached to the system, the voltage decreasing circuit converts the first DC voltage to the second DC voltage, the second DC voltage is provided to the panel computer, the first terminal and the second terminal of the switch unit are electrically connected, the second terminal and the third terminal of the switch unit are disconnected, the first DC voltage charges the battery unit via the charging unit.

8. The audio system of claim 7, wherein when the panel computer is detached from the system, the first terminal and the second terminal of the switch unit are disconnected, the second terminal and the third terminal of the switch unit are electrically connected, the battery unit outputs the first DC voltage, the voltage decreasing circuit converts the first DC voltage to the second DC voltage, the second DC voltage is provided to the panel computer.

9. The audio system of claim 8, wherein the switch unit is a single-pole double throw switch.

10. An audio system configured for a vehicle comprising:

a mainframe comprising an audio signal positive output terminal and a power signal output terminal, the audio signal positive output terminal being configured to output an audio signal;

a panel computer comprising an audio signal positive input terminal, the audio signal positive input terminal being configured to receive the audio signal, the panel computer being configured to convert the audio signal to an sound signal and to output the sound signal; and a power converting circuit comprising a charging unit, a switch unit, a battery unit and a voltage decreasing circuit; wherein when the power signal output terminal is electrically connected to the power converting circuit, the power signal output terminal outputs a first Direct Current (DC) voltage to the power converting circuit, the voltage decreasing circuit converts the first DC voltage to a second DC voltage which is provided to the panel computer, the first DC voltage charges the battery unit via the charging unit and the switch unit; and when the power signal output terminal and the power converting circuit are disconnected, the battery unit outputs the first DC voltage to the voltage decreasing circuit, the voltage decreasing circuit converts the first DC voltage to the second DC voltage which is provided to the panel computer.

11. The audio system of claim 10, wherein the charging unit comprises a first terminal and a second terminal; the first terminal of the charging unit is electrically connected to the power signal output terminal to receive the first DC voltage; the first terminal of the charging unit is electrically connected to the panel computer via the voltage decreasing circuit; the second terminal of the charging unit is electrically connected to the switch unit; the switch unit is grounded via the battery unit; and the switch unit is electrically connected to the panel computer via the voltage decreasing circuit.

12. The audio system of claim 11, wherein the switch unit comprises a first terminal, a second terminal and a third terminal; the second terminal of the charging unit is electrically connected to the first terminal of the switch unit; the second terminal of the switch unit is grounded via the battery unit; the third terminal of the switch unit is electrically connected to the first terminal of the charging unit; the third terminal of the switch unit is electrically connected to a first terminal of the voltage decreasing circuit; and a second terminal of the voltage decreasing circuit is configured for output the second DC voltage.

13. The audio system of claim 12, wherein the mainframe further comprises an audio signal negative output terminal; the panel computer further comprises an audio signal negative input terminal; the audio signal positive output terminal is configured to output the audio signal; and the audio signal negative input terminal is electrically connected to the audio signal negative output terminal to receive the audio signal.

14. The audio system of claim 13, wherein the first DC voltage is +12V; and the second DC voltage is +5V.

15. The audio system of claim 13, wherein panel computer is electrically connected to the mainframe by connecting lines or by inserting card and inserting slot.

16. The audio system of claim 13, wherein when the panel computer is attached to the system, the voltage decreasing circuit converts the first DC voltage to the second DC voltage, the second DC voltage is provided to the panel computer, the first terminal and the second terminal of the switch unit are electrically connected, the second terminal and the third terminal of the switch unit are disconnected, the first DC voltage charges the battery unit via the charging unit.

17. The audio system of claim 16, wherein when the panel computer is detached from the system, the first terminal and the second terminal of the switch unit are disconnected, the second terminal and the third terminal of the switch unit are electrically connected, the battery unit outputs the first DC voltage, the voltage decreasing circuit converts the first DC voltage to the second DC voltage, the second DC voltage is provided to the panel computer.

18. The audio system of claim 17, wherein the switch unit is a single-pole double throw switch.

* * * * *